Jan. 23, 1940. W. R. WILEY 2,188,026
CLIP
Original Filed Nov. 2, 1935
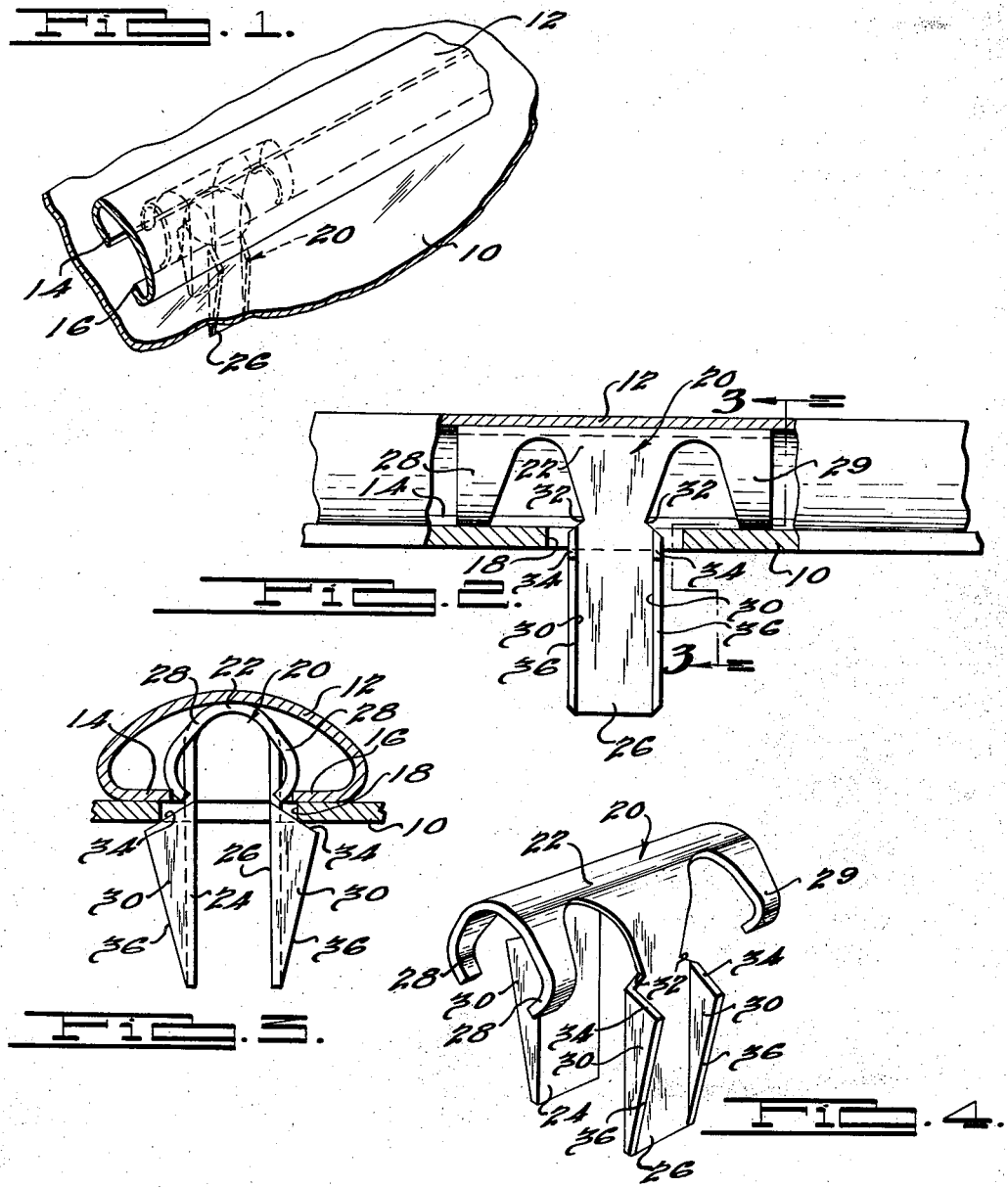
INVENTOR
William R. Wiley.
BY Harness, Dickey & Pierce.
ATTORNEYS.

Patented Jan. 23, 1940

2,188,026

UNITED STATES PATENT OFFICE 2,188,026

CLIP

William R. Wiley, Detroit, Mich.

Original application November 2, 1935, Serial No. 47,999. Divided and this application November 2, 1938, Serial No. 238,327

5 Claims. (Cl. 24—73)

The present invention relates to an improved attaching clip for attaching sheet metal moldings, or the like, to a sheet metal panel, and is a division of the co-pending application of William R. Wiley, Serial No. 47,999, filed November 2, 1935.

One of the primary objects of the present invention is to provide an attaching clip of the type mentioned, which is formed of resilient sheet metal material and which is so constructed that it may be applied quickly and effectively and accurately fix a channel shaped molding, or the like, to a sheet metal backing member.

Another object of the present invention is the provision of an improved attaching clip of the type mentioned, having leg portions with cam edges formed thereon, in which the cam edges are so constructed and arranged that considerable pressure is concentrated on the line edges thereof which engage the edge of an aperture through which the legs extend, so that there is a firm attachment between the attaching means and the panel.

Another object of the invention is the provision of an improved attaching clip of the type mentioned in which the area contact between the attaching clip and the edge of the aperture through which the clip extends is relatively small, while considerable pressure is concentrated on these areas, so that a firm attachment is effected.

Other objects of the invention will become apparent from the following specification, the drawing relating thereto, and from the claims hereinafter set forth.

In the drawing, in which like numerals are used to designate like parts in the several views throughout:

Figure 1 is a fragmentary, perspective view of a molding strip positioned on a panel, with an attaching clip according to the present invention associated therewith, the attaching clip being shown in broken lines;

Fig. 2 is an enlarged side elevational view, with parts broken away, showing parts in section and showing the clip in elevation, of the structure shown in Fig. 1;

Fig. 3 is a cross-sectional view, taken substantially along the line 3—3 of Fig. 2; and Fig. 4 is a perspective view of the clip shown in Figs. 1 to 3.

Referring to the drawing, a sheet metal panel is illustrated at 10, which is usually a part of an automobile body, having a channel shaped, metal molding strip 12 attached thereto. The molding 12 has inturned flanges 14 and 16, the outer surfaces of which are adapted to bear against the surface of the panel 10. The panel 10 is provided with apertures 18 at spaced intervals therealong, and such apertures may be formed by drilling, punching, or otherwise. When such apertures are formed, a burr is sometimes formed around the lower or back edge of the aperture. When present, this burr interferes with firm attachment of prior types of clips; but according to the present invention, the construction of the clip overcomes this objection and insures a firm engagement with the edge of the aperture whether the burr is present or not.

One embodiment of a clip attaching means, according to the present invention, is generally indicated at 20. Such clips are adapted to be positioned at spaced intervals along the length of the molding strip and panel, and are provided with anchoring portions which engage the molding and leg portions which extend through the apertures and engage the panel for securing the molding strip to the panel. These clips are stamped out of resilient sheet metal which is hardened and tempered and are generally U-shaped.

The base of the U is indicated at 22 and the clip has depending leg portions 24 and 26 integral with the base. Also attached to the base of the U are anchoring means in the form of curved branches 28 and 29 which are generally U-shaped and join the base of the U at opposite sides thereof. The curvature and size of the base 22, and particularly of the branches 28 and 29, are such that the curvature of the branches 28 and 29 is slightly greater than the distance between the inturned edges 14 and 16 of the molding 12, but so slightly greater that the resilient branches 28 and 29 can be easily forced therebetween. The resiliency of these branches is such that immediately upon the passage of the curved branches between the edges of the molding, the lower edges of the branches spring slightly outwardly against the inturned edges, as best shown in Fig. 3, so that the clips are firmly lodged within the channel of the molding.

The legs 24 and 26 each have their marginal or lateral edges outwardly turned to form wings 30 thereon. The legs are also preferably narrowed or necked at points indicated at 32, which points represent the approximate position of the panel 10 relative to the clips when the molding is firmly seated against the surface of the panel.

The edges of the wings 30 are cam shaped, and it is the shape of these edges which has particular significance in the present invention. The edges first diverge, as indicated at 34, and then converge, as indicated at 36. The resilient legs, together with the wings 30, form prongs which are adapted to be inserted through the apertures 18. The converging edge portions 36 form cam edges of narrow and substantially line thickness, which first engage the edge of the aperture 18 as the clip is inserted therethrough, so that the legs are urged towards each other and the clip may be readily inserted. When the clip reaches its innermost position, and when the molding 12 bears against the panel 10, the legs spring outwardly so that the diverging edge portions 34 engage the under surface of the aperture 18 and draw the molding tight against the panel in fixed position. The legs are of substantial width and are preferably transversely flat so that considerable pressure is exerted by the legs. Such pressure is concentrated in relatively small areas, that is, the relatively narrow edges of the diverging edges 34. The clips are hardened and are harder than the metal of the panel 10, so that the edges 34 dig into the under edge of the aperture 18. In the event that a burr is present, such thin edges will bite through the burr so that a firm attachment is provided. The provision of the wings 30 at each side of each leg serves to provide a contact between the clip and the aperture at four spaced apart points so that sufficient engagement is provided at properly spaced points for a firm locking of the clip within the panel aperture.

While in the embodiment of the invention specifically illustrated, the anchoring means 28 and 29 are illustrated as being attached to that end of the U-shaped clip adjacent the base 22, it is to be understood that such attaching means could be attached to the other end, that is, to the free ends of the legs 24 and 26 within the scope of the present invention. Such a position of the anchoring means is illustrated in another embodiment of the invention disclosed in the parent application referred to. In the event that the position of the anchoring means were changed in the specific embodiment of the invention here disclosed, the diverging portions 34 and converging portions 36 of the wings 30 would be reversed, thus arranging them in the same relation relative to the anchoring means as in the embodiment specifically described above. The significant feature of the present invention lies in the construction of the resilient legs having the wing portions with the diverging and converging edges, so that the contact pressure is concentrated in relatively small areas and a firm grip between the clip and panel is assured.

Formal changes may be made in the specific embodiments of the invention described without departing from the spirit and substance of the invention, the scope of which is commensurate with the appended claims.

What is claimed is:

1. An attaching clip formed of resilient metal material comprising a generally U-shaped sheet metal member, anchoring means formed on one end thereof, said member having legs integral with the base of the U, wing portions attached to both edges of said legs and lying in planes at an angle to the planes of the legs to which they are attached, and the edges of said portions first diverging from the end adjacent said anchoring means and then converging toward the other end to form cam edges.

2. An attaching clip formed of resilient metal material comprising a generally U-shaped sheet metal member, anchoring means formed on one end thereof, said member having legs integral with the base of the U, each of said legs having its opposite longitudinal edge portions extending outwardly, and the outer edges of said portions first diverging from the end adjacent said anchoring means and then converging toward the other end to form cam edges.

3. A clip formed of resilient metal material for securing a channel-shaped molding to a backing member having an aperture therethrough, comprising a generally U-shaped sheet metal member, anchoring means formed on one end thereof adapted to be anchored within said channel, said member having legs integral with the base of the U, opposite side portions of said legs extending outwardly to form oppositely extending wings, the outer edges of said portions first diverging from the end adjacent said anchoring means and then converging toward the other end to form cam edges, said legs and said wings extending through said aperture and so constructed and arranged that the diverging portion of said edges resiliently bears against the edge of said aperture.

4. An attaching clip formed of resilient metal material comprising a generally U-shaped sheet metal member, anchoring means formed on one end thereof, said member having legs integral with the base of the U, outwardly disposed wing portions attached to said legs and lying in planes at an angle to the planes of the legs to which they are attached, and the outer edges of said portions first diverging from the end adjacent said anchoring means and then converging toward the other end to form cam edges.

5. An attaching clip formed of resilient metal material comprising a generally U-shaped sheet metal member, anchoring means formed on one end thereof, said member having legs integral with the base of the U, said legs being elongated and transversally substantially flat, outwardly disposed wing portions attached to both of said legs adjacent the sides thereof and lying in planes substantially normal to the planes of the legs to which they are attached, and the outer edges of said wing portions first diverging from the end adjacent said anchoring means and then converging toward the other end to form cam edges.

WILLIAM R. WILEY.